Oct. 9, 1973   MASAHIRO KUWAZAKI ET AL   3,764,392
INSIDE-OUT PRIMARY DRY CELL WITH CARBON-RESIN FILM
ON INSIDE SURFACE OF CONTAINER
Original Filed July 11, 1969   2 Sheets-Sheet 1

M. KUWAZAKI, A. OTA & T. TAKATA
INVENTORS

BY Stevens, Davis, Miller & Mosher
ATTORNEYS

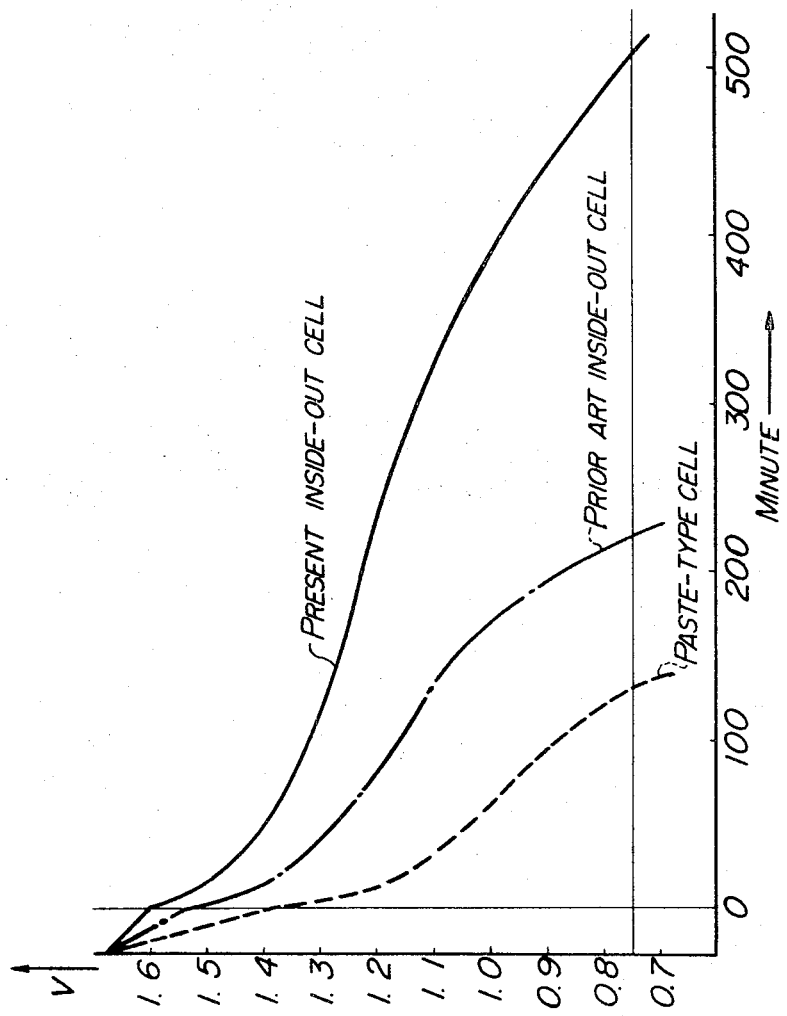

United States Patent Office 3,764,392
Patented Oct. 9, 1973

3,764,392
INSIDE-OUT PRIMARY DRY CELL WITH CARBON-RESIN FILM ON INSIDE SURFACE OF CONTAINER
Masahiro Kuwazaki and Akira Ota, Osaka, and Toshikatsu Takata, Moriguchi, Japan, assignors to Matsushita Electric Industrial Co., Ltd., Osaka, Japan
Continuation of abandoned application Ser. No. 840,998, July 11, 1969. This application May 3, 1971, Ser. No. 139,842
Claims priority, application Japan, July 16, 1968, 43/50,951
Int. Cl. H01m 21/00
U.S. Cl. 136—107
8 Claims

ABSTRACT OF THE DISCLOSURE

An inside-out dry cell having excellent performances, particularly in heavy-load discharge, which comprises a positive electrode-constituting, top-closed cylindrical collector having the inner surface thereof coated with a film consisting of a carbonaceous substance and a synthetic resin, and simultaneously serving as an outer casing of the cell; a cathode mixture charged in said positive electrode-constituting collector; a zinc negative electrode inserted into the center of said cathode mixture and having formed on the surface thereof a paste layer formed of a paste-containing resin material and an ion-permeable barrier membrane of polyvinyl alcohol superposed on said paste layer for blocking transfer of the paste material into the cathode mixture; and a metallic closure plate adapted to close the opening of said positive electrode-constituting collector and including a conductor adapted to grip the connecting end of said zinc negative electrode to establish electrical connection between said zinc negative electrode and said closure plate assembly in an engaged position of said closure plate.

CROSS-REFERENCE TO RELATED APPLICATION

This is a continuation of Ser. No. 840,998, filed July 11, 1969, now abandoned.

The present invention relates to a Leclanche cell, more specifically to an inside-out dry cell, having improved performances.

Improvement in the discharge performance of a dry cell, either under a heavily-loaded condition or under a lightly-loaded condition, is possible only by improving the activity of the manganese dioxide used, increasing the amount of cathode mixture charged in the cell and increasing the surface area of the positive electrode-constituting collector, and for this purpose the following measures have been considered.

In the progress of a conventional Leclanche cell, use was made of a cathode mixture which was prepared by molding a mixture consisting essentially of natural manganese dioxide blended with graphite, acetylene black ammonium chloride and zinc chloride, into a shape conforming to the shape of the particular dry cell, with the provision for the insertion of a carbon rod in the center thereof, which carbon rod serves as positive electrode-constituting collector. However, a dry cell incorporating such a cathode mixture was far remote from satisfaction in respect of its discharge performance under either a heavily-loaded condition or a lightly-loaded condition, because the natural manganese dioxide is low in purity containing large amounts of foreign matter, poor in preservability and further low in activity. Later, electrolytic manganese dioxide having high purity and high activity came to be used and the discharge performance per gram of cathode mixture has been improved. In recent years when cell-operative machinery and equipments are becoming more and more precise, a dry cell of high current and high performance has come into greater demand. However, since the discharge capacity of a cell is subjected to a limitation by the amount of cathode mixture contained in the cell and the type of positive electrode-constituting collector, it is necessary, for increasing the amount of cathode mixture and thereby improving the discharge performance of the cell, to reduce the thickness of the paste layer. Along this line, the so-called paper-type cell was devised to replace the conventional paste-type cell. Namely, in the paste-type cell the paste layer is formed by dissolving a natural starch in an electrolyte consisting essentially of zinc chloride and ammonium chloride, and applying the resultant solution to the inner surface of a negative electrode-constituting zinc casing, said starch being gelatinized between said zinc casing and a cathode mixture, after insertion of said cathode mixture into the zinc casing, by the zinc chloride contained in the cathode mixture or by heat, whereas a separator paper is used inplace of the aforesaid paste layer to reduce the distance between the cathode mixture and the zinc casing and thereby to increase the amount of cathode mixture to be contained in said zinc casing, said separator paper having one side thereof coated by roll coating with a solution of a paste material, consisting essentially of starch, in an electrolyte consisting essentially of zinc chloride and ammonium chloride, and wrapped around said cathode mixture. However, such a paper-type cell was still unsatisfactory in that the internal resistance is large, the short-circuit current is markedly lowered and the discharge maintaining voltage is low, on account of the facts that the paper used as the separator has small ion-permeability and that the carbon rod is positioned in the center of the cathode mixture; and is, therefore, not adapted for heavy-load discharge.

In order to overcome the foregoing drawbacks, an inside-out cell was newly developed. The structure of the inside-out cell will be explained hereunder with reference to FIGS. 6 to 9. A metallic closure member 3 having a positive electrode terminal (a cap) 2 formed integrally therewith is fixedly mounted in the open to the end of a cylinder 1 made of kraft paper and on the inner surfaces of the cylinder 1 and the closing member 3 is formed a wall of compressed carbon powder constituting a positive electrode-constituting collector, whereby an outer casing of the cell is formed. In such structure, if the thickness of the positive electrode-constituting collector, consisting of the carbon wall 4, is reduced with a view increasing the amount of cathode mixture to be contained in the cell, the outer casing consisting of the kraft paper cylinder 1 would be wetted with the electrolyte penetrating through the interspace of the carbon particles in the carbon wall 4 and thus the electrolyte would leak to the outside. In this view of this, it has been customary that the carbon wall 4 or the positive electrode-constituting collector to be used as a container of the inside-out dry cell is formed of a thickness of 1 to 3 mm., so as to retard the penetration velocity of the electrolyte. However, since the amount of cathode mixture 5 to be contained in the cell is influenced by the thickness of the carbon wall 4, it was impossible to dispose a sufficient amount of cathode mixture in the cell when the thickness of the carbon wall 4 was large. In addition, the carbon wall 4 is not sufficiently resistive to shock due to its inherent character, so that it is easily cracked by an external shock given thereto, providing for leakage of the electrolyte through the cracks. There was another drawback in that the electrolyte is urged through the interspace of the carbon particles as the gas pressure interior of the cell rises and thus the time for the electrolyte to reach the kraft paper cylinder 1 is shortened. Furthermore, the electricity collecting effect was reduced incident to increase in contact resistance between the closure member 3 and the carbon wall 4.

Still further, a negative electrode body used in the conventional inside-out cell was formed by wrapping a negative electrode-constituting zinc strip 7 of the shape as shown in FIG. 8 with the aforesaid separator paper consisting of a kraft paper or the like and having a paste layer 8 formed on one side thereof, and flexing said covered zinc strip along the center lines (the dotted lines in FIG. 8) into a cross-shape in cross section as shown in FIG. 9. Therefore, it was extremely difficult to tightly attach the separator paper to the corner portions of the zinc strip 7 and the workability of the negative electrode body 6 was extremely low. Still further, satisfactory contact between the cathode mixture 5 and the kraft paper could not be obtained, with the result that the internal resistance of the cell was large and the discharge performance and preservability of the cell were degraded. The internal resistance was further increased and the preservability was further degraded by the crystallization of zinc compounds on the surface of the negative electrode-constituting zinc strip upon penetration of the paste material and water through the fiber structure of the separator paper into the anolyte mixture during storage of the cell. This is because the paste material diffuses through the separator paper. In order to avoid this, it becomes necessary to provide a barrier membrane which is capable of preventing the transfer of the paste material into the cathode mixture and of retarding the transfer of water, but a dry cell incorporating such barrier membrane has not been materialized.

Still another disadvantage of the conventional inside-out cell is that, since in sealing the open bottom end of the casing 1 the cross-shaped negative electrode body 6 was secured at its lower end to a metallic closure member 10 as by soldering, the operation was quite complicated and the workability was much impaired. In addition, since the outer casing was made of the cylindrical kraft paper, it was impossible to completely seal the junction between said outer casing and the metallic closure members, and leakage frequently occurred. In order to retard the occurrence of leakage and to prevent the drying of the cathode mixture temporarily, it was proposed to provide a wax layer 9 on the surface of the cathode mixture but the formation of such a wax layer inevitably resulted in decrease of the cathode mixture and was not effective for the inside-out dry cell.

It is, therefore, the object of the present invention to provide an improved inside-out dry cell which obviates the above-described drawbacks possessed by the conventional one and which has an excellent performances.

Namely, according to the present invention a top-closed, metallic container being free of seam or abutting joint and having a positive electrode terminal cap integrally therewith is used as a positive electrode-constituting collector which simultaneously serves as the outer casing of a cell, and a film consisting of a carbonaceous substance and a synthetic resin is formed on the inner surface of said container, instead of forming a carbon wall as in the conventional cell, whereby the amount of anolyte mixture to be accommodated in the cell is increased to increase the discharge capacity, while the internal resistance of the cell is decreased.

Still according to the present invention the negative electrode body used is produced by laminating a zinc strip with a film of water-insoluble, adhesive polyvinyl alcohol with a starchy substance blended therein to form a paste layer and further forming on top of said paste layer-constituting film, a film consisting solely of polyvinyl alcohol which is soluble in water, non-swellable in electrolyte, stretchable, touch, ion-permeable and capable of blocking the transfer of paste material, instead of wrapping a zinc strip with a resin-coated paper as in the conventional cell, whereby a rupture of the paste layer in insertion of the negative electrode body can be prevented, transfer of the paste material into the cathode mixture and transfer of the cathode mixture into the paste layer are prevented during storage of the cell, which was experienced in the case of the conventional cell, and consequently the preservability of the cell is improved. Therefore, by practicing the present invention, a complete sealing can be attained between the positive electrode-constituting collector and a metallic closure member having conductive means fixedly connected thereto for connection with the negative electrode body, and the preservability and the leakage-proofness of the cell can be improved.

Other features and advantages of the present invention will become more apparent from the following description when taken in conjunction with the accompanying drawings, in which:

FIG. 10 is a diagram graphically showing the continuous discharge characteristics of the present cell and the conventional cells.

Figure 2:
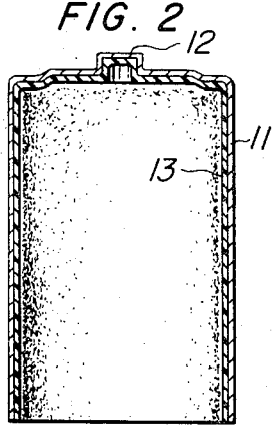
FIG. 2 is a vertical sectional view of the positive electrode-constituting collector of the cell.

First of all, the positive electrode-constituting collector of the inside-out cell according to the present invention, which enables the amount of cathode mixture in the cell to be increased, will be explained with reference to FIG. 2. A metallic container 11 closed at one end, with an outwardly projecting cap 12 formed at the center of the closed end, and simultaneously serving as an outer casing of the cell, is produced by pressing from a 0.2 to 0.7 mm. thick sheet material, such as an iron plate, tinned sheet iron or galvanized sheet iron, which is inexpensive and which has a large mechanical strength. After plating the inner surface of the metallic container 11 with chromium or nickel, a mixture of a thermoplastic resin, such as polyethylene, vinyl chloride, vinyl acetate vinyl acetate copolymer or a ethylene-vinyl acetate copolymer, and carbonaceous compounds, such as graphite and acetylene black, in the proportion, for example, of 5 parts of polyvinyl-vinyl acetate copolymer, 3 parts of graphite and 2 parts of acetylene black, is molten at a temperature of about 180° C. and poured into said metallic container. The container is turned upside down to discharge excess melt therefrom and then cooled, whereby a carbon-binding resin film 13 is formed on the inner surface of the metallic container 11 in a thickness of about 0.7 mm. Alternatively, the carbon-binding resin film 13 may be formed by a process comprising mixing 5.5 parts of vinyl chloride-vinyl acetate copolymer with 1.5 parts of acetylene black and 3 parts of graphite, filling the resultant mixture in the metallic container 11 heated at about 250° C. whereby the resin component is melt-bonded to the inner surface of said container, discharging excess unmolten mixed powder from the container by turning said container upside down, and drying the molten resin by heating the container. In this case, a carbon-binding resin film having a thickness of 0.3 to 0.4 mm. is obtained. Still alternatively, the carbon-binding resin film 13 may be formed by a process comprising mixing a thermoplastic resin, such as polyvinyl chloride or polyvinyl acetate, or a thermosetting resin, such as epoxy resin, urethane resin or silicone resin, with carbonaceous compounds, such as graphite and acetylene black, in the proportion, for example, of 3 parts of epoxy resin, 2 parts of polyamide resin, 2 parts of acetylene black and 3 parts of graphite, adding to the resultant mixture a solvent, such as xylol, toluol or cyclohexanone to dissolve the resin components, filling the carbonaceous compound-containing resin solution in the metallic container 11, discharging excess solution from the container by turning said container upside down whereby a predetermined quantity of said solution is attached to the inner surface of the container, and then drying the carbon-containing solution by heating it at 80° C. for 30 minutes. In this case, a carbon-binding resin film having a thickness of 0.2 to 0.7 mm. can be formed. In pouring the carbonaceous compound-containing resin solution into the metallic container for coating the inner surface of said container therewith, the viscosity of the solution is preferably made relatively high by reducing the amount of solvent used, because if the viscosity is low a carbon-binding resin film having a sufficient strength cannot be obtained. On the other hand, if a spray gun or the like is used for coating, a carbon-binding resin film of a desired thickness can be obtained by increasing the frequency of the spray-coating operation, even when the solution is relatively low in viscosity. Furthermore, in any process described above the resin component in the mixture is preferably in the proportion of 1 to 1.5 parts per 1 part of carbonaceous componnet, in consideration of the bonding strength of the resin film with respect to the metallic container 11 and the conductivity of said film. It has been verified that an amount of resin smaller than the value would result in insufficient bonding strength and tightness between the carbon-binding resin film 13 and the inner surface of the metallic container 11, although the resultant film is excellent in conductivity, whereas an amount of resin larger than the value specified would result in greater resistance and low conductivity of the film.

According to the present invention, as described above, a carbon layer can be formed simply by closely contacting a mixture of carbonaceous compound and resin with the inner surface of a top-closed, cylindrical, metallic container, so that the workability is markedly improved relative to the prior art cells. It is also to be noted that, since the container 11 is of metal, it is possible to obtain a good bond between the metallic container and the carbon layer, excellent current-collecting property and conductivity, and a high current. Namely, a dry cell can be obtained which has excellent discharge characteristic under heavily-loaded conditions. Incidentally, the metallic container 11 may be formed of an aluminum alloy sheet, other than of the aforesaid iron plate, tinned sheet iron and galvanized sheet iron, which is easy to shape but expensive relative to the latter.

Figure 3:
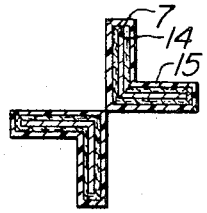
FIG. 3 is a transverse sectional view of the negative electrode body of the cell.

Next, the paste layer to be formed on a negative electrode-constituting zinc strip to be used in the present inside-out dry cell will be explained with reference to FIG. 3. The paste layer 14 can be formed on the negative electrode-constituting zinc strip 7 in the following manner: Namely, a mixture consisting of 50 to 80 parts of polyvinyl alcohol and 50 to 20 parts of starch, cellulose derivative or water-soluble high molecular compound is dissolved in 50 parts of water, and using the resultant solution a film is formed on the flat surface of a plate in a predetermined thickness by means of a roller. The film thus formed is gelatinized with electrolyte, so that when the film is cut into the shape of the zinc strip and attached to said zinc strip after wetting it with water or electrolyte, said film is tightly bonded on the zinc strip forming a paste layer 14, no matter how complicated the shape of the zinc strip, because the film is very adhesive. Such a close contact of the paste layer 14 with the zinc strip 7 is advantageous in avoiding the crystallization of zinc compounds on the surface of said zinc strip and, therefore, in improving the preservability of the cell.

On top of the paste layer 14 thus formed is further laminated a film 15 of polyvinyl alcohol having a saponification degree of 80 to 100 mol percent and a polymerization of about 1500, which film is soluble in water but insoluble in and swellable with electrolyte and is stretchable, and has a large mechanical strength.

The negative electrode of the structure described above may alternatively be produced by dipping the zinc strip 7 into an aqueous solution, for example, of 40 to 70 parts of polyvinyl alcohol and 60 to 30 parts of starch substance, such as corn starch or wheat flour, having a water concentration of 15 to 30%, drying the aqueous solution layer on said zinc strip at a temperature of about 70° C. to form the paste layer 14, and then laminating said paste layer 14 with the barrier film 15 of the type described above. Still alternatively, the negative electrode may be produced by heating the zinc strip 7 and dipping the heated zinc strip into a mixture consisting of ethylene-vinyl acetate copolymer and a natural starch, such as corn starch, wheat flour or karayagame, a cellulose derivative, such as methyl cellulose, carboxymethyl cellulose, or a water-soluble high molecular compound, such as polyvinyl alcohol or polyacrylamide, thereby to form the paste layer 14 on said zinc strip, and thereafter forming on top of said paste layer the ion-permeable barrier film of polyvinyl alcohol adapted to block the transfer of said paste material therethrough.

More practically, 50 parts of a thermoplastic resin consisting of ethylene-vinyl acetate copolymer, 20 parts of a starch, such as corn starch or wheat flour, 20 parts of methyl cellulose and 10 parts of karayagame are mixed, while on the other hand the zinc strip 7 is heated to about 250° C. The heated zinc strip 7 is dipped into the mixed powder to form the paste layer 14 thereon and thereafter the barrier film 15 of polyvinyl alcohol having a saponification degree of 80 to 100 mol percent and a polymerization degree of 1500, which is soluble in water but insoluble in and swellable with electrolyte and is stretchable, and has a large mechanical strength, is laminated on said paste layer 14.

In either process, the negative electrode-constituting zinc strip 7 and the paste layer 14 produce a tight bond therebetween. When the negative electrode thus produced in the cell, the transfer of the paste material and water, of which the paste layer is formed, into the cathode mixture, and accordingly drying of the paste layer and crystallization of zinc compounds on the surface of the zinc strip can be completely prevented due to the presence of the barrier film. Another advantage of the negative electrode 16 thus produced is that the paste layer 14 and the barrier film 15 are not delaminated from the zinc strip 7 in the insertion of said negative electrode into the cathode mixture, so that internal shorting of the cell can be prevented and the preservability and the discharge performance of the cell can be greatly improved.

Figure 9:
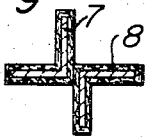
FIG. 9 is a transverse sectional view of the negative electrode body incorporated in the cell of FIG. 6.
Figure 6:
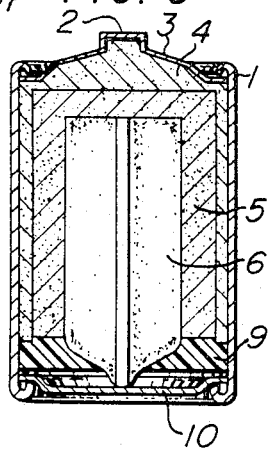
FIG. 6 is a vertical sectional view of a conventional inside-out dry cell.
Figure 7:
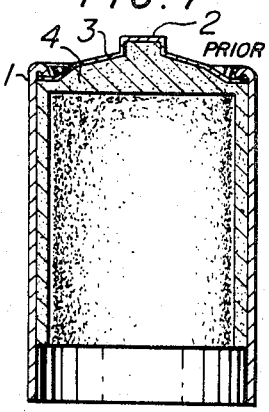
FIG. 7 is a vertical sectional view of the positive electrode-constituting collector used in the cell of FIG. 6.
Figure 8:
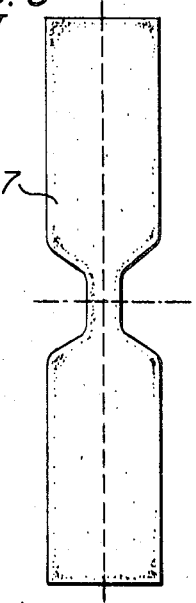
FIG. 8 is a developed view of zinc strip constituting the negative electrode of the cell of FIG. 6.

The zinc strip which constitutes the body of a negative electrode is preferably in a substantially cross-shape as shown in FIG. 9 or in a split circular shape in cross section, because such a shape facilitates the insertion of the negative electrode into the cathode mixture 5. The length of the zinc strip is variable depending upon the height of the cell but is normally on the order of 48 mm. in the length of the reacting surface thereof, in the case of the UM-1 type cell, which is slightly greater than the height of the cathode mixture 5. The width of the negative electrode is normally about ⅘ of the diameter of the cathode mixture 5 when it is crossed in shape, and about ⅗ of the diameter of the cathode when it is cylindrical in shape. Whether the shape of the negative electrode being cross or cylindrical, both the inner and the outer surfaces of the electrode participate in the discharge reaction, so that the area of reacting surface is much larger than that of the zinc negative electrode of the conventional cell, which constitutes thhe casing of the cell.

Figure 4:
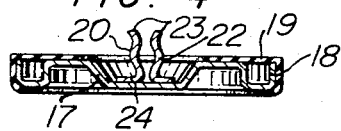
FIG. 4 is a vertical sectional view of the metallic closure plate assembly for closing the open bottom end of the cell.
Figure 5:
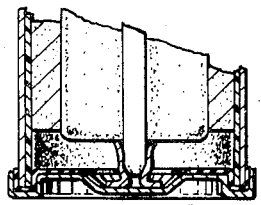
FIG. 5 is a vertical sectional view of parts of the metallic closure plate assembly of FIG. 4, illustrating the manner of closing the open bottom end of the positive electrode-constituting collector.

The closure plate assembly which is used for closing the open bottom end of the inside-out dry cell of this invention is constructed as follows: Namely, as shown in FIG. 4, the closure plate assembly comprises a closure plate member 17 formed peripherally thereof with an annular depressed portion 18 adapted to embrace the peripheral edge of the bottom opening of the container 11 and an insulating ring 19 having an L-shaped cross section and fitted on said closure plate member 17 covering the depressed portion 18, said insulating ring preferably being made of such a material as polyvinyl chloride or rubber, so as to simultaneously serve as a packing for providing a liquid-tight sealing between the container 11 and the closure plate member 17. In closing the bottom opening of the container 11 with the closure plate assembly, the depressed portion 18 of the closure plate member 17 and the insulating ring 19 are flexed inwardly as shown in FIG. 5.

Provided centrally of the inner surface (or the upper surface) of the closure plate member 17 is a conductor 20 which consists of a pair of elastic, substantially L-shaped leads welded to said closure plate member 17 at their horizontal leg portions 24, with their upright portions being opposed by each other, and by which the negative electrode 16 and the closure plate member 17 are electrically connected with each other. The leads 23 are each made from a spring steel sheet and curved outwardly relative to each other at the central portion of the upright portion, so as to form a grip 22 for gripping the connecting end 21 of the negative electrode 16.

Because of the construction described above, when the closure plate member 17 is pressed against the bottom end of the container 11, the insulating ring 19 is forced into the depressed portion 18 by the peripheral edge of the opening of said container and at the same time the conductor 20 is automatically located opposite the connecting end 21 of the negative electrode 10 and grips said connecting end by the grip 22.

Figure 1:
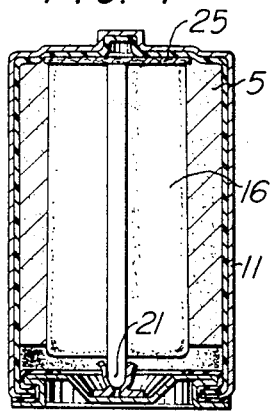
FIG. 1 is a vertical sectional view of an inside-out dry cell according to the present invention.

FIG. 1 shows in cross section the entire view of the inside-out cell which has been closed by the closure plate assembly of the type described above. The inside-out dry cell according to the present invention was compared with the prior art inside-out cell and the conventional paste-type dry cell, on the basis of the UM-1 type, in respect of discharge capacity, preservability, leakage-proof property, amount of cathode mixture accomodated and short-circuit current, with the results shown in Table 1, 2, 3, 4 and 5 respectively. A reference numeral 25 designates insulating paper.

TABLE 1.—COMPARISON IN DISCHARGE CAPACITY

|  | Continuous discharge with 4-ohm load up to final voltage of 0.75 V., min. | 700 ma. constant current continuous discharge up to final voltage of 0.75 V., min. | 30 min./day intermittent discharge with 4-ohm load up to final voltage of 0.85 V. min. |
| --- | --- | --- | --- |
| Present cell | 1,800 | 500 | 2,300 |
| Prior art inside-out cell | 1,200 | 220 | 1,500 |
| Conventional ordinary cell | 900 | 130 | 1,000 |

TABLE 2.—COMPARISON IN PRESERVABILITY
(Discharge performance after storage for 9 months at 45° C.)

|  | Continuous discharge with 4-ohm load up to final voltage of 0.75 V., min. | 700 ma. constant current continuous discharge up to final voltage of 0.75 V., min. | 30 min./day intermittent discharge with 4-ohm load up to final voltage of 0.85 V., min. |
| --- | --- | --- | --- |
| Present cell | 1,750 | 450 | 2,250 |
| Prior art inside-out cell | 1,000 | 150 | 1,300 |
| Conventional ordinary cell | 820 | 100 | 960 |

TABLE 3.—COMPARISON IN LEAKAGE-PROOF PROPERTY
(By Continuous discharge with 4-ohm load after storage for 60 days at a Temperature of 30° C. and Humidity of 80%)

|  | After 10 days | After 30 days | After 60 days | Total |
| --- | --- | --- | --- | --- |
| Present cell | 0/100 | 0/100 | 0/100 | 0/100 |
| Prior art inside-out cell | 10/100 | 10/90 | 50/80 | 70/100 |
| Conventional ordinary cell | 2/100 | 7/98 | 12/91 | 21/100 |

NOTE.—Numerator indicates the number of leaked cells.

TABLE 4.—COMPARISON IN AMOUNT OF ANOLYTE MIXTURE ACCOMMODATED (UM-1 TYPE)

|  | G. |
| --- | --- |
| Present cell | 75 |
| Prior art inside-out cell | 58 |
| Conventional ordinary cell | 52 |

TABLE 5

Comparison in short-circuit current

|  | A. |
| --- | --- |
| Present cell | 18.0 |
| Prior art inside-out cell | 12.0 |
| Conventional ordinary cell | 7.0 |

Further, when these three types of cells were continuously discharged at a constant current of 700 ma., a result was obtained as shown in FIG. 10.

From the results shown in the foregoing tables and FIG. 10, it will be obvious that the inside-out cell of the present invention is superior to the conventional cells in respect of performance.

What is claimed is:

1. An inside-out primary dry cell comprising an outer container of a top-closed, cylindrical, metallic container formed from a member selected from the group consisting of tinned iron, galvanized iron and aluminum alloy serving as a positive electrode collector, said container having a positive electrode terminal integrally formed at said closed top portion and having a conductive film comprising a mixture of carbonaceous substance and synthetic resin formed on the inner surface thereof; a cathodic mixture disposed in said metallic container and substantially coextensive therewith, said mixture primarily comprising manganese dioxide; a negative zinc electrode body having formed on the zinc surface thereof a paste layer for holding electrolyte and further having formed on said paste layer a polyvinyl alcohol film, said film forming a barrier which is insoluble in electrolyte, ion-permeable and capable of blocking transfer of the paste material in said paste layer into said cathode mixture, a metallic closure plate, electrically connected with said negative electrode body, said plate closing the bottom opening of said container and serving as a negative electrode terminal; and insulator means disposed between said plate and said container.

2. An inside-out primary dry cell as defined in claim 1, wherein said conductive film comprises a carbonaceous substance and synthetic resin the ratio of 1:1 to 1.5, respectively.

3. An inside-out primary dry cell as defined in claim 1, wherein said conductive film comprises a synthetic resin and a carbonaceous substance, said synthetic resin being selected from the group consisting of polyethylene, polyvinyl acetate, polyvinyl chloride, ethylene-vinyl acetate copolymer, vinyl chloride-vinyl acetate copolymer, epoxy resin, urethane resin and silicone resin.

4. An inside-out primary dry cell as defined in claim 1, wherein said polyvinyl alcohol film with 80 to 100 mol percent of saponification value and 1500 of polymerization degree is disposed on said paste layer of said negative electrode body.

5. An inside-out primary dry cell comprising: a positive electrode collector having a top-closed, cylindrical, metallic container formed from a member selected from the group consisting of tinned iron, galvanized iron and aluminum alloy having a positive electrode terminal integrally and seamlessly formed at said closed top portion; a conductive film disposed on the inner surface of said container and comprising a mixture of carbonaceous substance and epoxy resin; a cathodic mixture disposed in said container and substantially coextensive therewith; a negative zinc electrode body having disposed on the zinc surface thereof a paste layer, a polyvinyl alcohol film disposed on said paste layer, said film being insoluble in electrolyte, ion-permeable and capable of blocking transfer of the paste material in said paste layer into said cathodic mixture; a metallic closure plate having means to grip one end of said negative electrode body, said plate having a conductor electrically connected with said negative electrode body, said plate closing the bottom opening of said top-closed, cylindrical container and serving as a negative electrode terminal; and insulator means disposed between said plate and said container.

6. An inside-out primary dry cell as defined in claim 5, wherein said conductor comprises a pair of substantially L-shaped leads fixed on said closure plate with the upright portions thereof in opposed relation to each other, said upright portions of the respective leads having means disposed at their central portions for gripping the lower end of said negative electrode body, the respective horizontal portions of said leads being fixed on the inner surface of said metallic closure plate.

7. An inside-out primary dry cell comprising a top-closed, cylindrical, metallic container serving as a positive electrode collector, said container having a positive electrode terminal integrally formed at said closed top portion and having a conductive film comprising a mixture of carbonaceous substance and epoxy resin formed on the inner surface thereof; a cathodic mixture disposed in said metallic container and substantially coextensive therewith, said mixture primarily comprising manganese dioxide; a negative zinc electrode body having formed on the zinc surface thereof a paste layer for holding electrolyte and further having formed on said paste layer a polyvinyl alcohol film, said film being insoluble in electrolyte, ion-permeable and capable of blocking transfer of the paste material in said paste layer into said cathodic mixture; a metallic closure plate, electrically connected with said negative electrode body, said plate closing the bottom opening of said container and serving as a negative electrode terminal; and insulator means disposed between said plate and said container: wherein said top-closed, cylindrical, metallic container is formed from a member selected from the group consisting of tinned iron, galvanized iron and aluminum alloy; said conductive film comprises a carbonaceous substance and epoxy resin the ratio of 1:1 to 1.5, respectively; and said polyvinyl alcohol film with 80 to 100 mol percent of saponification value and 1500 of polymerization degree is disposed on said paste layer of said negative electrode body.

8. An inside-out primary dry cell as defined in claim 7, wherein said top-closed, cylindrical, metallic container comprises the outer container of said dry cell and said polyvinyl alcohol film forms a barrier to the transfer of said paste material to said cathodic mixture.

References Cited

UNITED STATES PATENTS

| | | | |
|---|---|---|---|
| 2,807,658 | 9/1957 | Hatfield | 136—107 |
| 3,463,669 | 8/1969 | Jommet | 136—107 |
| 3,428,494 | 2/1969 | Wotanabe et al. | 136—102 |
| 3,513,033 | 5/1970 | Wotanabe et al. | 136—107 |
| 3,485,675 | 12/1969 | Ruben | 136—107 |
| 3,530,496 | 9/1970 | Amano et al. | 136—107 |
| 2,923,757 | 2/1960 | Klopp | 136—107 |

ALLEN B. CURTIS, Primary Examiner

C. F. LE FEVOUR, Assistant Examiner